United States Patent Office 3,641,201
Patented Feb. 8, 1972

3,641,201
ACID RESISTANT POLYESTER RESINS
William J. Heilman, Allison Park, Pa., assignor to Gulf Research & Development Company, Pittsburgh, Pa.
No Drawing. Filed Nov. 10, 1969, Ser. No. 875,572
Int. Cl. C08f 21/00, 21/02
U.S. Cl. 260—867                    3 Claims

ABSTRACT OF THE DISCLOSURE

The acid resistance and flexural strength of cross-linked polyester resins is increased by using small amounts of glycidyl methacrylate or glycidyl acrylate in their preparation.

FIELD OF THE INVENTION

This invention relates to the preparation of novel cross-linked polyester resins of improved acid resistance and flexural strength; and more particularly it relates to the preparation of novel cross-linked polyester resins of improved acid resistance and flexural strength which have been formulated with a minor amount of glycidyl methacrylate or glycidyl acrylate.

BACKGROUND OF THE INVENTION

Cross-linked thermosetting polyester resins are prepared by utilizing an unsaturated compound, such as maleic anhydride, in forming the backbone chain to introduce unsaturation into the chain. Adjacent chains are then readily cross-linked through the sites of unsaturation by vinyl polymerization using a suitable cross-linking agent such as styrene. These polymers possess many properties including high strength and heat stability which make them useful in a variety of applications. Unfortunately these polymers are very sensitive to acidic environments and on exposure to strong acids will readily lose their flexural strength. Flexural strength is the resistance of a material to bending stress and is obtained by subjecting a standardized strip of a polymer-reinforced, layered fiber glass composite to bending stress in accordance with ASTM D790–49T.

A conventional cross-linked polyester resin is prepared from the union of propylene or ethylene glycol and a combination of maleic anhydride and phthalic anhydride in the backbone chain with styrene serving as the cross-linker. In order to improve the acid-resistance of this formulation it has been suggested that one or more of the monomers be replaced. For example, it has been suggested that improved aicd resistance is obtained by substituting bisphenol A for the propylene or ethylene glycol, that fumaric acid be used instead of the maleic anhydride or that isophthalic acid replace the phthalic anhydride. Various proposed solutions, such as these, are disadvantageous in that they add too much to the raw material costs of the constituents and/or that the acid resistance is not sufficiently improved.

The reason for the poor acid resistance of these cross-linked polyester resins is not understood. It is recognized that these cross-linked polyester resins contain sites of potential instability such as the internal ester groups and the terminal carboxylic acid and hydroxyl groups. It is believed that the prime cause for acid instability is associated with these groups, however, the mechanism of such instability is not understood.

SUMMARY OF THE INVENTION

I have discovered that the acid resistance of these general purpose, cross-linked polyester resins can be substantially increased by the addition of relatively small amounts of glycidyl methacrylate or glycidyl acrylate in the formulation of these resins. And not only is the acid resistance of these resins increased but also the initial flexural strength is appreciably increased as well as additional properties. The acid resistance and the initial flexural strength of these resins is significantly increased if at least about 0.1 weight percent is added to the resin formulation and that further improvement is noted with an increasing amount of the glycidyl methacrylate or the glycidyl acrylate in the formulation up to about five weight percent. Above about five percent no further increase in these properties is observed by a further increase in the additive.

I do not understand how the glycidyl methacrylate or the glycidyl acrylate functions in the resin formulation to accomplish this increase in acid resistance and initial flexural strength. I have tried other additives including methyl methacrylate and epichlorohydrin and have found that these additives provide appreciably less improvement in the properties under consideration.

As indicated, my invention is particularly suitable for upgrading general purpose, cross-linked polyester resins. Preferably these resins are made by the use of equimolar amounts of polyethylene glycol or polypropylene glycol and a mixture of phthalic anhydride and maleic anhydride. The glycol moiety will polymerize with an anhydride moiety to form the backbone chain.

Although I find it convenient to use equimolar amounts of the phthalic anhydride and maleic anhydride, this proportion can be varied as desired. Since the maleic anhydride introduces the cross-linkable sites, that is the unsaturation, into the backbone chain, the proportion of maleic anhydride that is utilized will have a significant effect on the degree of cross-linking taking place and therefore the ultimate physical properties of the product resin. Too much maleic anhydride is less desirable because in this case the olefin density of the chain is so great that not all of these points of unsaturation can effectively function in the vinyl polymerization reaction with the result that excess cross-linker, e.g. styrene, will be retained in the final polymer to the detriment to its properties. If too little maleic anhydride is used, there will be little cross-linking possible with the result that the polymer will possess properties similar to the thermoplastic resin and therefore be unsuitable for the intended use. The proportion of maleic anhydride in the phthalic anhydride-maleic anhydride mixture can vary from a broad range of 20 to 90 mol percent to a perferred range of 40 to 60 mol percent.

Although maleic anhydride and phthalic anhydride are the preferred anhydride reactants because of ease of reaction and modest cost, other equivalent anhydrides or acids can be used. For example, fumaric acid or maleic acid can be used instead of maleic anhydride and isophthalic acid, terephthalic acid, and the corresponding diacids of benzophenone can be used instead of phthalic anhydride. Also the ethylene glycol or propylene glycol can be replaced partly or in toto with bisphenol A, 1,4-cyclohexanedimethanol or other suitable diol, and also with ethylene oxide.

The preferred cross-linking component in our general purpose resin in styrene. Since two styrene molecules generally link up in each cross-linking chain, it is convenient to employ about two mols of the styrene for each mol of maleic anhydride. Other structures with terminal unsaturation, including methyl methacrylate, vinyl toluene, chlorostyrene, triallyl cyanurate, etc., are suitable as cross-linking agents.

In preparting the improved thermosetting polyesters of my invention the glycidyl methacrylate or glycidyl acrylate is added in appropriate amount to a polyester resin which comprises the preformed unsaturated polyester dissolved in the cross-linking monomer. This is then subjected to vinyl polymerization at conventional conditions.

The art of preparing the preformed unsaturated polyester is well known and need not be described in detail herein. These preformed unsaturated backbone chains are commercially available either alone or dissolved in the cross-linking monomer.

The glycidyl methacrylate or glycidyl acrylate is added to the mixture of polyester and cross-linking monomer in suitable amount together with a suitable polymerization catalyst such as a peroxide. The mixture is then applied to a fiber glass laminate and cured in a conventional manner. The cure can conveniently be carried out at a temperature between about room temperature and 250° C. and at a pressure between about 25 and 100 p.s.i. A post cure, if desired, is effected at a higher temperature, such as 120° C. to 200° C. at reduced pressure such as atmospheric pressure.

The following examples are set forth as illustrative of my invention without any intention of limiting my invention.

EXAMPLE 1

A mixture was prepared which contained 35 weight percent styrene and an unsaturated polyester made from an equimolar mixture of maleic anhydride and phthalic anhydride using one mol of propylene glycol for each mol of anhydride. To separate portions of this mixture was added 10 weight percent of glycidyl methacrylate, epichlorohydrin and methyl methacrylate as indicated in Table 1. One percent benzoyl peroxide was added to each portion and then separate 12 ply fiber glass cloth layers were impregnated with each resulting mixture. The fiber glass cloth had been treated wtih a commercially used silane compound for improved adhesion. The impregnated material was cured at 77° C. and 100 p.s.i. for one hour and subjected to a post cure at 120° C. and atmospheric pressure for one hour. The cured material was cut into strips one inch wide and ⅛ inch thick. Each strip except a blank was subjected to a different set of test conditions as set out in Table 1. Each strip was then clamped in a holder and a force perpendicular to the strip was applied at a rate of 0.05 inch per minute at a span of two inches across the points of support. In Table 1 the flexural strength in p.s.i. divided by 1,000 is set out:

TABLE 1

| Additive, 10% | None | G.M. | E. | M.M. |
|---|---|---|---|---|
| Test: | | | | |
| Blank | 65.3 | 79.9 | 56.3 | 80.9 |
| 4 days at 160° F. in— | | | | |
| 20% H₂SO₄ | 2.2 | 53.1 | 11.1 | 36.2 |
| Distilled H₂O | 51.2 | 65.3 | 44.4 | 64.6 |
| Iso-octane | 68.0 | 81.9 | 55.9 | 86.8 |
| Boiling water: | | | | |
| 1 day | 51.2 | 72.1 | 48.6 | 68.4 |
| 2 days | 37.3 | 52.2 | 44.7 | 47.4 |
| 3 days | 37.8 | 44.7 | 46.1 | 45.3 |
| 4 days | 34.0 | 45.0 | 36.6 | 46.4 |

NOTE.—G.M.=Glycidyl methacrylate; E.=Epichlorohydrin; M.M.=Methyl methacrylate.

Although the use of glycidyl methacrylate increased the resistance of the treated material to many deteriorating environments, its most striking effect is the increase in initial flexural strength and the resistance to strong acids imparted to the resin. In other tests it was determined that there was no improvement in resistance to strong alkali.

EXAMPLE 2

The same tests as described in Example 1 were performed on a second series of strips made in the same manner except that a different amount of glycidyl methacrylate was used in formulating each resin. The flexural strengths divided by 1,000 are set forth in Table 2.

TABLE 2

| Percent glycidyl methacrylate | 0 | 1 | 5 | 10 | 20 |
|---|---|---|---|---|---|
| Test: | | | | | |
| Blank | 65.3 | 70.4 | 83.8 | 83.1 | 79.9 |
| 4 days at 160° F. in— | | | | | |
| 20% H₂SO₄ | 2.2 | 50.8 | 64.4 | 65.0 | 53.1 |
| Distilled H₂O | 51.2 | 58.2 | 79.8 | 80.5 | 65.3 |
| Iso-octane | 68.0 | 72.7 | 82.0 | 85.4 | 81.9 |
| Boiling water: | | | | | |
| 1 day | 51.2 | 50.9 | 66.8 | 71.0 | 72.1 |
| 2 days | 37.3 | 44.4 | 53.2 | 55.2 | 52.2 |
| 3 days | 37.8 | 36.5 | 52.6 | 49.5 | 44.7 |
| 4 days | 34.0 | 34.8 | 43.2 | 48.9 | 45.0 |

It is noted that maximum initial flexural strength occurs at about five percent glycidyl methacrylate. Although slight improvement in acid resistance occurs when 10 percent glycidyl methacrylate is used in the preparation of the resin, the indicated improvement is well within experimental error and does not warrant the increased amount of glycidyl methacrylate addition. When used in the same manner, glycidyl acrylate functions with equivalent efficacy as glycidyl methacrylate.

Although these specific examples exemplify the improvement in initial strength of the general purpose polyester resin as well as a substantial increase in its resistance to strong acids when used as a composite with fiber glass, this increase in properties is general regardless of the actual use of the polyester resin. For example, the addition of glycidyl methacrylate or glycidyl acrylate to a polyester resin containing clay and chopped fiber glass, can be cured to a thermosetting sheet having improved acid resistance and initial flexural strength. In a similar manner the additive can be used to same advantage in a clay-filled thermosetting polyester resin putty composition.

It is to be understood that the above disclosure is by way of specific example and that numerous modifications and variations are available to those of ordinary skill in the art without departing from the true spirit and scope of the invention.

I claim:
1. The acid-resistant thermosetting polyester composition which is made by crosslinking a mixture of
   an unsaturated polyester resin formed from about 20 to about 30 mol percent maleic anhydride, about 30 to about 20 mol percent phthalic anhydride and about 50 mol percent of ethylene glycol, propylene glycol or mixtures thereof;
   about two mols of styrene for every mol of said maleic anhydride; and
   about 0.1 to about five weight percent glycidyl methacrylate or glycidyl acrylate.
2. The acid-resistant thermosetting polyester composition in accordance with claim 1 which comprises from about one to about five weight percent glycidyl methacrylate or glycidyl acrylate.
3. The acid-resistant thermosetting polyester composition in accordance with claim 2 which comprises about 25 mol percent maleic anhydride and about 25 mol percent phthalic anhydride.

References Cited

UNITED STATES PATENTS 3,011,994    12/1961    Davies et al. _____ 260—40

MELVIN GOLDSTEIN, Primary Examiner

U.S. Cl. X.R.

117—126 GR; 161—195, Dig. 4; 260—40 R